US009831738B2

(12) United States Patent
Yamasaki et al.

(10) Patent No.: US 9,831,738 B2
(45) Date of Patent: Nov. 28, 2017

(54) ROTATING ELECTRIC MACHINE WITH SEALING MEMBERS

(71) Applicant: DENSO CORPORATION, Kariya, Aichi-pref. (JP)

(72) Inventors: Masashi Yamasaki, Obu (JP); Daisuke Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 445 days.

(21) Appl. No.: 14/525,565

(22) Filed: Oct. 28, 2014

(65) Prior Publication Data

US 2015/0115755 A1 Apr. 30, 2015

(30) Foreign Application Priority Data

Oct. 30, 2013 (JP) .................................. 2013-225302

(51) Int. Cl.
*H02K 5/10* (2006.01)
*H02K 5/15* (2006.01)
*H02K 11/02* (2016.01)
*H02K 11/33* (2016.01)

(52) U.S. Cl.
CPC .................. *H02K 5/10* (2013.01); *H02K 5/15* (2013.01); *H02K 11/024* (2013.01); *H02K 11/33* (2016.01)

(58) Field of Classification Search
CPC .. H02K 5/10; H02K 5/15; H02K 5/04; H02K 5/225; H02K 11/33; H02K 11/024
USPC ....................................... 310/71, 91, 418, 89
See application file for complete search history.

(56) References Cited

U.S. PATENT DOCUMENTS

| 5,243,245 | A | * | 9/1993 | Oba | ......................... | H02K 5/15 |
| | | | | | | 310/89 |
| 2011/0211978 | A1 | * | 9/2011 | Dybdal | .................... | H02G 3/22 |
| | | | | | | 310/87 |
| 2012/0161689 | A1 | * | 6/2012 | Yamasaki | .............. | H02K 11/33 |
| | | | | | | 318/724 |

(Continued)

FOREIGN PATENT DOCUMENTS

| JP | 57-115555 | 7/1982 | |
| JP | 2007-185055 | 7/2007 | |
| JP | 2007185055 A | * 7/2007 | ............... H02K 5/10 |

(Continued)

OTHER PUBLICATIONS

Machine translation of JP 2007185055 A (Jul. 2007).*

(Continued)

*Primary Examiner* — Michael Andrews
(74) *Attorney, Agent, or Firm* — Nixon & Vanderhye P.C.

(57) ABSTRACT

A rotating electric machine includes a cover formed in a cylindrical shape and extending in an axial direction to cover the controller section, a lid section disposed inside of the cover body to seal the cover body, a first sealing member compressed between the lid section and the cover, and a second sealing member compressed in a different direction than the first sealing member between the cover and the first frame or the second frame. The rotating electric machine also includes a tab formed on an outer periphery of the first frame or the second frame, and a claw extending from the one end of the cover body and engageable with the tab to hold the sealing members in a compressed state. As a result, the rotating electric machine is sealed from dust and water.

11 Claims, 12 Drawing Sheets

(56) References Cited

U.S. PATENT DOCUMENTS

2012/0176073 A1* 7/2012 Amagasa ............... H02K 7/116
  318/400.38
2013/0257232 A1* 10/2013 Tomizawa ............. H02K 11/33
  310/68 R

FOREIGN PATENT DOCUMENTS

| JP | 2013-090376 | 5/2013 |
| JP | 2013-090377 | 5/2013 |

OTHER PUBLICATIONS

Office Action (3 pages) dated Sep. 1, 2015, issued in corresponding Japanese Application No. 2013-225302 and English translation (4 pages).

Yamasaki et al., U.S. Appl. No. 14/525,548, filed Oct. 28, 2014.

* cited by examiner

ROTATING ELECTRIC MACHINE WITH SEALING MEMBERS

CROSS REFERENCE TO RELATED APPLICATION

The present application is based on and claims the benefit of priority of Japanese Patent Application No. 2013-225302, filed on Oct. 30, 2013, the disclosure of which is incorporated herein by reference.

TECHNICAL FIELD

The present disclosure generally relates to a rotating electric machine having a seamless body that contains both a motor section and a controller section.

BACKGROUND INFORMATION

Conventionally, a rotating electric machine has a motor section and a controller section for controlling the motor section. For example, in the rotating electric machine disclosed in a patent document 1 (i.e., Japanese Patent Laid-Open No. 2013-90377), the controller section is positioned in an axially non-overlapping position with the stator of the motor section. The positioning of the controller section outside of the stator in the axial direction may also be described as being positioned in an area outside of the stator of the motor section in an axial direction. In other words, the controller section and the motor section do not share a range of axial coordinates.

In the rotating electric machine of the patent document 1, the motor case is covered by a cylindrical shaped motor case, and the controller section is covered by a cylindrical shaped cover, respectively, for the preventing the intrusion of dust, water and the like into those sections. Further, rust is prevented. Even further, an annular sealing member is provided at a joint between the motor case and the cover. The annular sealing member prevents the intrusion of dust, water, etc., into the controller section through the joint.

Further, an opening is formed at a predetermined position on an opposite end of the cover of the controller section, i.e., the opposite end of the cover of the controller section relative to the motor case. The opening of the cover is sealed by a resin-made connector that is glued thereon. In such configuration, when glue used to seal a gap between the connector and the opening of the cover is not sufficiently sealed, dust, water, etc., may intrude into the controller section through the gap between the connector and the cover. When the dust, water, etc. intrudes into the controller section, malfunction of the controller section may be caused and/or a metal in the controller section may rust.

Further, in the structure of the rotating electric machine of the patent document 1, a shape of a connecting part that connects the connector and the cover is not a simple one. That is, the rotating electric machine in the patent document 1 has its cover and the connector connected by adhesion (e.g., glue). Therefore, it is difficult for the rotating electric machine of the patent document 1 to have an elastically-deformable sealing member or the like disposed at a position between the cover and the connector in a compressed state.

Further, when the rotating electric machine in the patent document 1 has two sealing members, i.e., one sealing member disposed at a joint part between the motor case and the cover in addition to the other elastically-deformable sealing member at a position between the connector and the cover, in case that the two sealing members are compressed in the same direction, the sealing structure of the two sealing members may be evenly affected by the stress, the twisting force and the like at a time of assembly, which may cause the same assembly error or the like. Therefore, the dust-proof and water-proof structure by the two sealing member may be damaged by such stress or the twisting force. In other words, the stress in one direction in the course of assembly of the rotating electric machine in the patent document 1 may deteriorate or damage all sealing structures when all sealing structures are configured in the same manner.

SUMMARY

It is an object of the present disclosure to provide a rotating electric machine that has a simple structure for providing a dust-proof and water-proof character for a controller section thereof.

In an aspect of the present disclosure, the rotating electric machine is provided with a motor section, a shaft, a controller section, a first frame, a second frame, a cover, a lid section, a first sealing member, a second sealing member, and a fastener.

The motor section has an annular stator, a winding wire wound around the annular stator, and a rotor disposed rotatably in an inside of the stator. The shaft is disposed at a center of rotation of the rotor. The controller section is disposed in an axially non-overlapping position with the stator and controls a supply of electric power to the winding wire for a drive control of the motor section.

The first frame is disposed at a position between the stator and the controller section. The second frame is disposed on an opposite side of the motor section relative to the first frame, in which the motor section is interposed between the first and second frames. The cover has a cover body with a cylindrical shape that extends in an axial direction of the stator toward (i) one end of the cover body, and (ii) the first frame or the second frame, to cover at least the controller section.

The lid section is disposed on an opposite side of the controller section relative to the motor section and inside of the cover body to seal an other end of the cover body. The first sealing member has an annular shape and is disposed in a compressed manner for maintaining air and/or water-tight sealing of a gap between (i) the lid section and (ii) the cover. The second sealing member has an annular shape, is disposed also in a compressed manner for maintaining air-tight and water-tight sealing of a gap between (i) the one end of the cover and (ii) the first frame or the second frame, and the manner of compression of the second sealing member pointing in a different direction from the manner of compression of the first sealing member. The fastener fastens the cover onto at least one of the first frame, the second frame or the lid section, and maintains the first and second sealing members in a compressed state.

Further, in the present disclosure, the first sealing member is compressed in a parallel direction that is parallel with an axis of the cover body, and the second sealing member is compressed in a perpendicular direction that is perpendicular to the axis of the cover body.

In addition, in the present disclosure, the cover includes an inside annular section that extends from the other end of the cover body toward the one end of the cover, the first sealing member is disposed between the lid section and the inside annular section, and the second sealing member is disposed between (i) the first frame or the second frame and (ii) the one end of the cover.

Even further, in the present disclosure, the first sealing member is compressed in a perpendicular direction that is perpendicular to an axis of the cover body, and the second sealing member is compressed in a parallel direction that is parallel with the axis of the cover body.

Additionally, in the present disclosure, the cover includes an outer flange that extends in a radially outward direction from the one end of the cover body, the first sealing member is disposed at a position between the lid section and the other end of the cover, and the second sealing member is disposed at a position between (i) the first frame or the second frame and (ii) the outer flange.

Moreover, in the present disclosure, the fastener includes a tab formed on an outer periphery of the first frame or the second frame, and a claw extending from the one end of the cover body and engageable with the tab.

Further, in the present disclosure, the lid section has a groove formed on a surface of the lid section relative facing the cover, and the cover has an extension that engages the groove.

In addition, in the present disclosure, the fastener is a screw that fastens the cover to the lid section, the first frame, or the second frame.

Even further, in the present disclosure, the rotating electric machine also includes a connector connected to at least one of (i) a power supply wire harness extending from the lid section in an opposite direction that is opposite to the controller section, the power supply wire harness supplying an electric power for the winding wire, or (ii) a control wire harness that transmits a signal to the controller section.

As described above, the controller section is at least covered by the cylinder-shape cover in the present disclosure. Further, a space/gap between (i) each of both ends of the cover and (ii) the lid section, the first frame, or the second frame is sealed in an air/water-tight manner with the first sealing member or the second sealing member. Therefore, such a structure devised by the cover and the first/second sealing members effectively prevents dust, water, etc., from intruding into the controller section. Thus, a simple structure of the present disclosure provides a dust/water/rust protection for the controller section.

Further, in the present disclosure, the first sealing member and the second sealing member are disposed in the compressed state and the compression directions of the first sealing member and the second sealing member are respectively different. Therefore, the sealing structure by the first sealing member and/or the second sealing member may escape, i.e., be prevented, from being evenly affected by the stress, the twisting force and the like in the course of assembly, thereby not suffering from the same assembly error or the like. Thus, the deteriorated dust-proof and water-proof character of the simple structure by the first/second sealing member will not be caused.

Further, when the one end of the cover is configured to extend to cover the second frame, the motor section and the controller section are covered by the cover. Therefore, intrusion of dust/water or the like into the motor section is also prevented by the cover.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
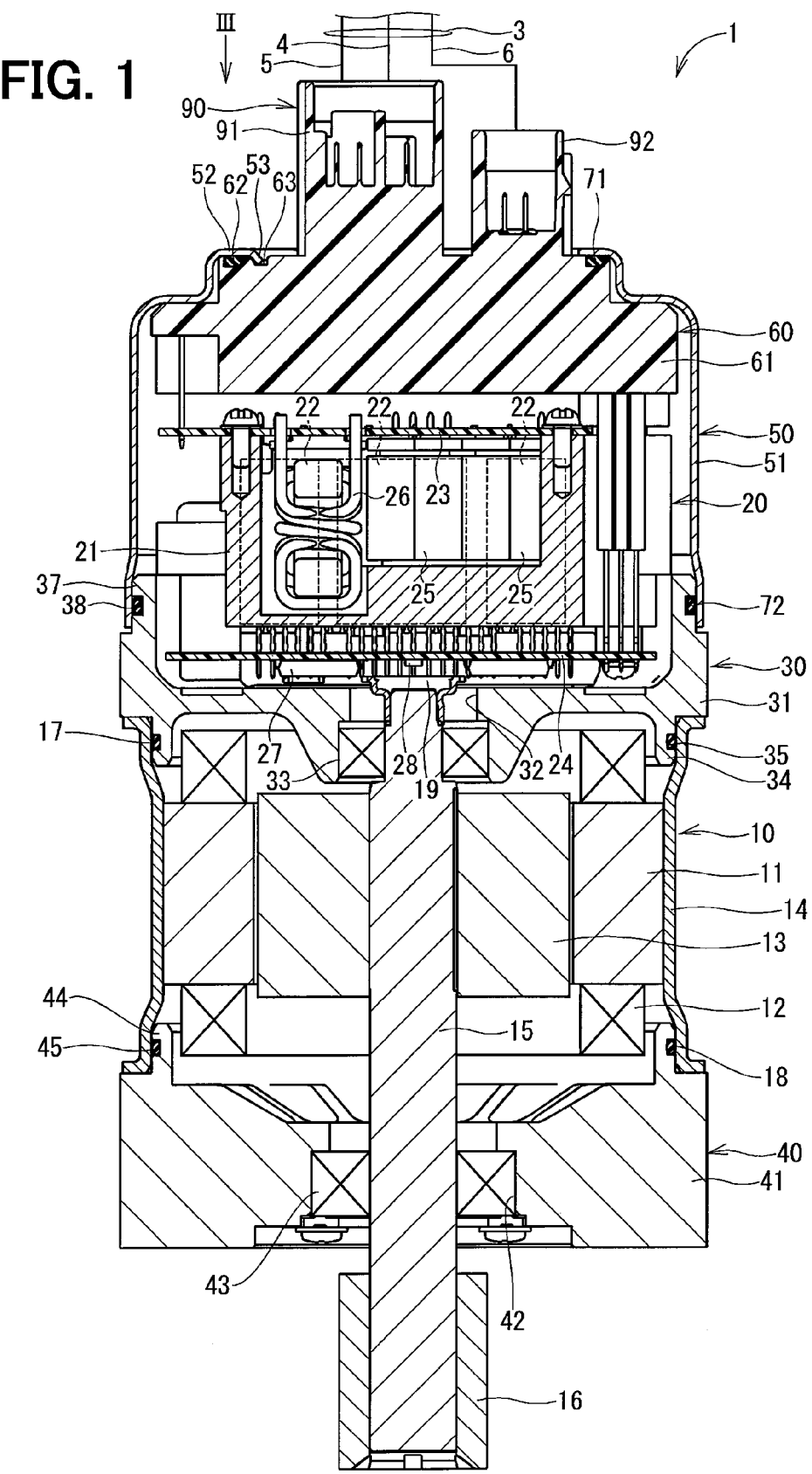
FIG. 1 is a sectional view of a rotating electric machine in a first embodiment of the present disclosure.

Hereafter, the rotating electric machine in many embodiments of the present disclosure and the electric power steering device using the same are described with reference to the drawings. In the following embodiments, like parts have like numbers, and description of the same/like parts will not be repeated. Further, for the simplicity of the drawing, from among similar/same parts in one drawing, only one part may have the number on behalf of the others.

First Embodiment

The rotating electric machine in the first embodiment of the present disclosure is shown in FIG. 1. The rotating electric machine 1 is driven by receiving an electric power supply, for example, and is used in an electric power steering device for assisting a steering operation of a vehicle.

Figure 2:
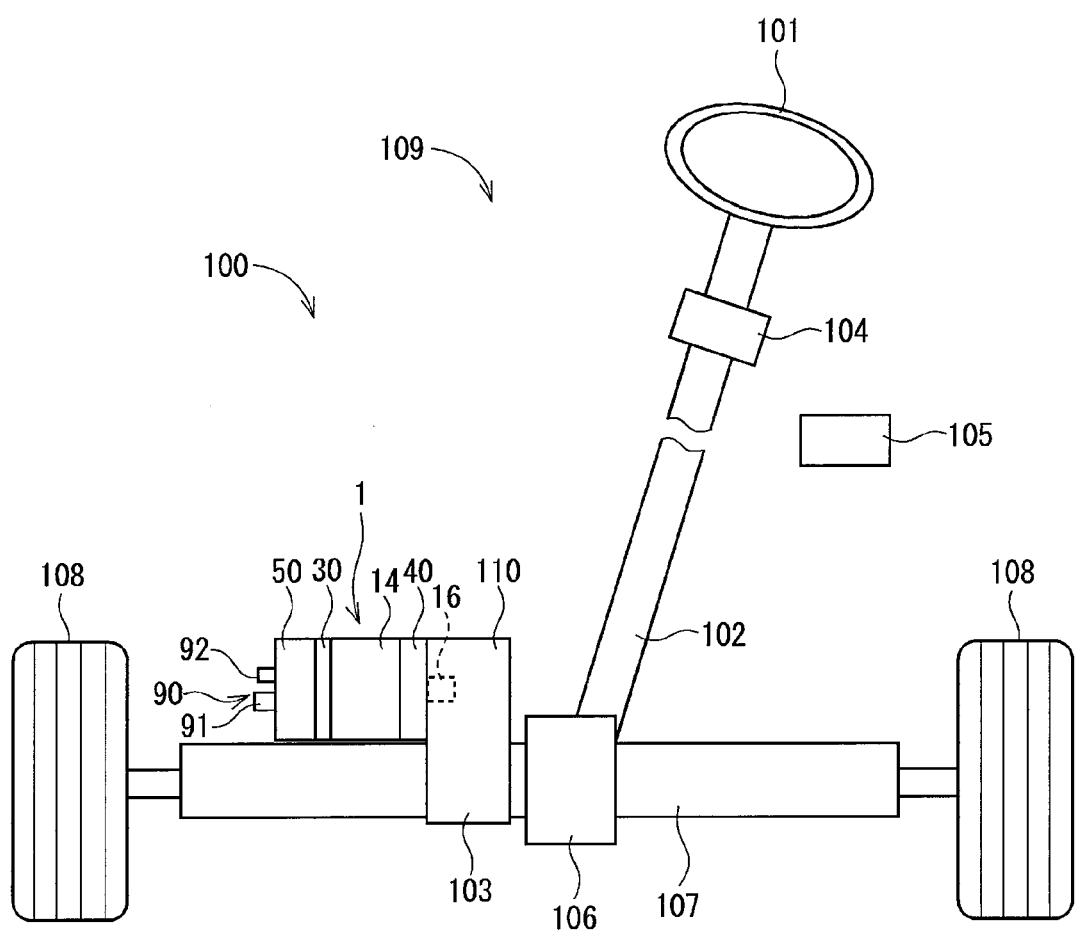
FIG. 2 is an illustrative diagram of the rotating electric machine in the first embodiment of the present disclosure being applied to an electric power steering device.

FIG. 2 shows an entire configuration of a steering system 100 having an electric power steering device 109. In the electric power steering device 109, a torque sensor 104 is disposed on a steering shaft 102 that is connected to a steering wheel 101. The torque sensor 104 detects a steering torque that is inputted to the steering shaft 102 via the steering wheel 101 from a driver.

A pinion gear 106 is disposed at a tip of the steering shaft 102, and the pinion gear 106 engages a rack shaft 107. On both ends of the rack shaft 107, a pair of tires 108 is steered via a tie rod etc.

In such configuration, when the driver rotates the steering wheel 101, the steering shaft 102 connected to the steering wheel 101 rotates, and a rotational movement of the steering shaft 102 is converted into a linear movement of the rack shaft 107 by the pinion gear 106, and the pair of tires 108 are steered by an angle according to an amount of straight movement of the rack shaft 107.

The electric power steering device 109 is provided with (a) the rotating electric machine 1 which generates a steering-assist torque and (b) a speed reduction gear 103 which slows down a rotation speed of the rotating electric machine 1 and transmits the rotation to the rack shaft 107, together with other parts. According to the present embodiment, the rotating electric machine 1 is attached to a housing 110 of the speed reduction gear 103.

The rotating electric machine 1 is a three-phase-circuit drive type brushless motor, and is driven by receiving an electric power supply from a battery which is not illustrated, for example. The rotating electric machine 1 rotates the speed reduction gear 103, which is a driving object, toward a normal rotation direction or toward a reverse rotation direction. The electric power steering device 109 includes the above-mentioned torque sensor 104 and a speed sensor 105 which detects the vehicle speed.

In such configuration, the electric power steering device 109 generates the steering assist torque from the rotating electric machine 1 for assisting a steering of the steering wheel 101 based on the signal from the torque sensor 104 and the speed sensor 105 etc., and transmits it to the rack shaft 107 via the speed reduction gear 103. Thus, in the present embodiment, the electric power steering device 109 is a rack assist type electric power steering device.

As shown in FIGS. 1, 3-5, the rotating electric machine 1 includes a motor section 10, a shaft 15, a controller section 20, a first frame 30, a second frame 40, a cover 50, a lid section 60, sealing members 71, 72, a connector 90 and the like.

The motor section 10 has a stator 11, a winding wire 12, a rotor 13, a motor case 14 and the like.

The stator 11 is formed approximately in a cylindrical shape with metal, such as iron, for example.

The winding wire 12 is formed with metal, such as copper, for example, and is wound around the stator 11.

The rotor 13 is formed approximately in a cylindrical shape with metal, such as iron, for example. The magnet which is not illustrated is disposed on an outer wall of the rotor 13. The rotor 13 is coaxially disposed with the stator 11 in an inside of the stator 11.

The motor case 14 is formed approximately in a cylindrical shape with metal, for example. The stator 11 is accommodated in the motor case 14 in a fixed manner.

The shaft 15 is formed in a rod shape with metal, for example, and is disposed at the center of the rotor 13 to have one body with the rotor 13.

As shown in FIG. 1, the controller section 20 is disposed in an axial outside area of the stator 11 of the motor section 10, and controls a drive of the motor section 10 by controlling an electric power supply to the winding wire 12. The controller section 20 is described later in full detail.

As shown in FIG. 1, the first frame 30 is provided at a position between the motor section 10 and the controller section 20. The first frame 30 has a frame body 31, a cylinder part 34, a cylinder part 37 and the like.

The frame body 31 is formed substantially in a circular disk shape with metal, for example. A through hole 32 which pierces through the frame body 31 along a board thickness direction is disposed at the center of the frame body 31. In an inside of the hole 32 concerned, a bearing member 33 is disposed coaxially with the frame body 31.

The cylinder part 34 extends from a motor section side surface of the frame body 31 in a cylindrical shape along a board thickness direction. On an outer wall of the cylinder part 34, an annular groove 35 is formed. In the groove 35, a sealing member 17 is disposed. The sealing member 17 is made with an elastic member such as a rubber to have an annular shape, and is elastically deformable when an external force is applied thereon.

Figure 3:
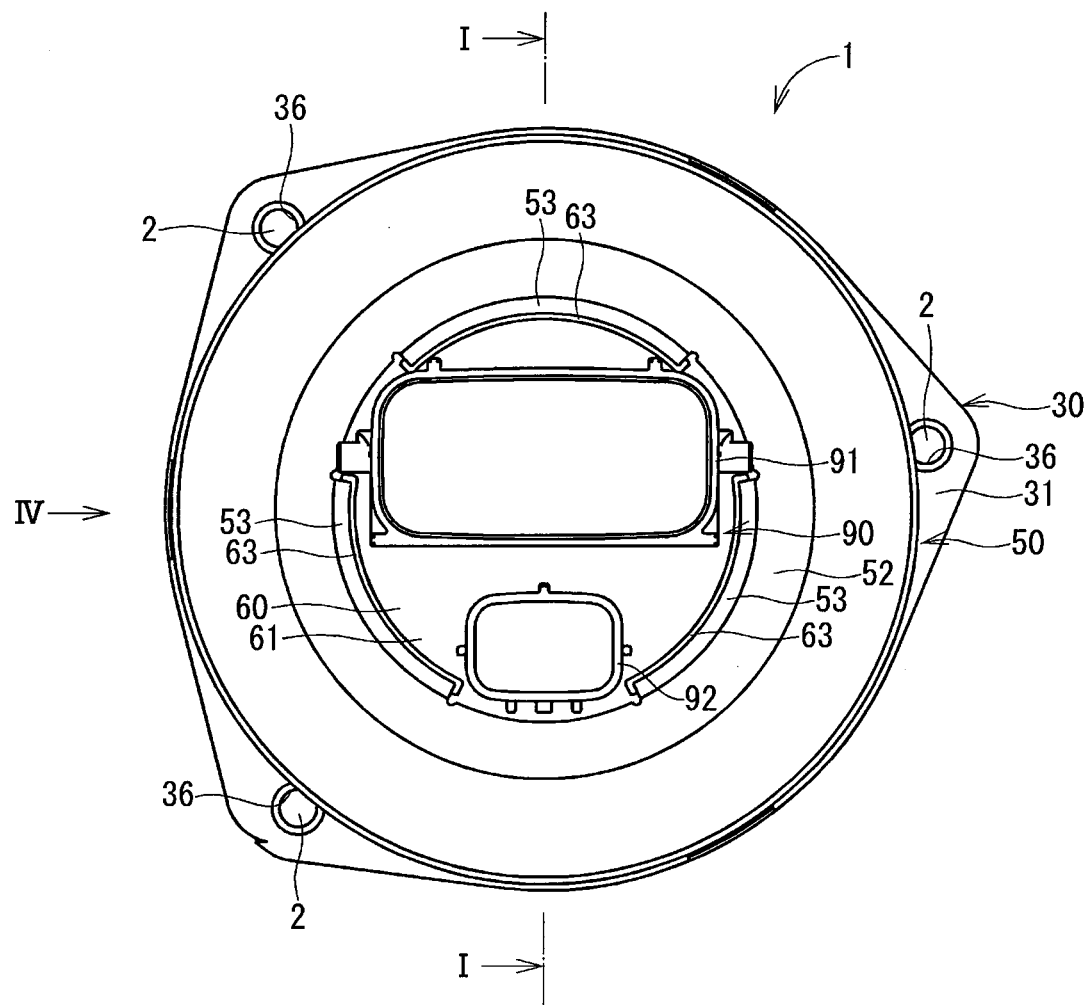
FIG. 3 is a view of the rotating electric machine in FIG. 1 along an arrow III.
Figure 5:
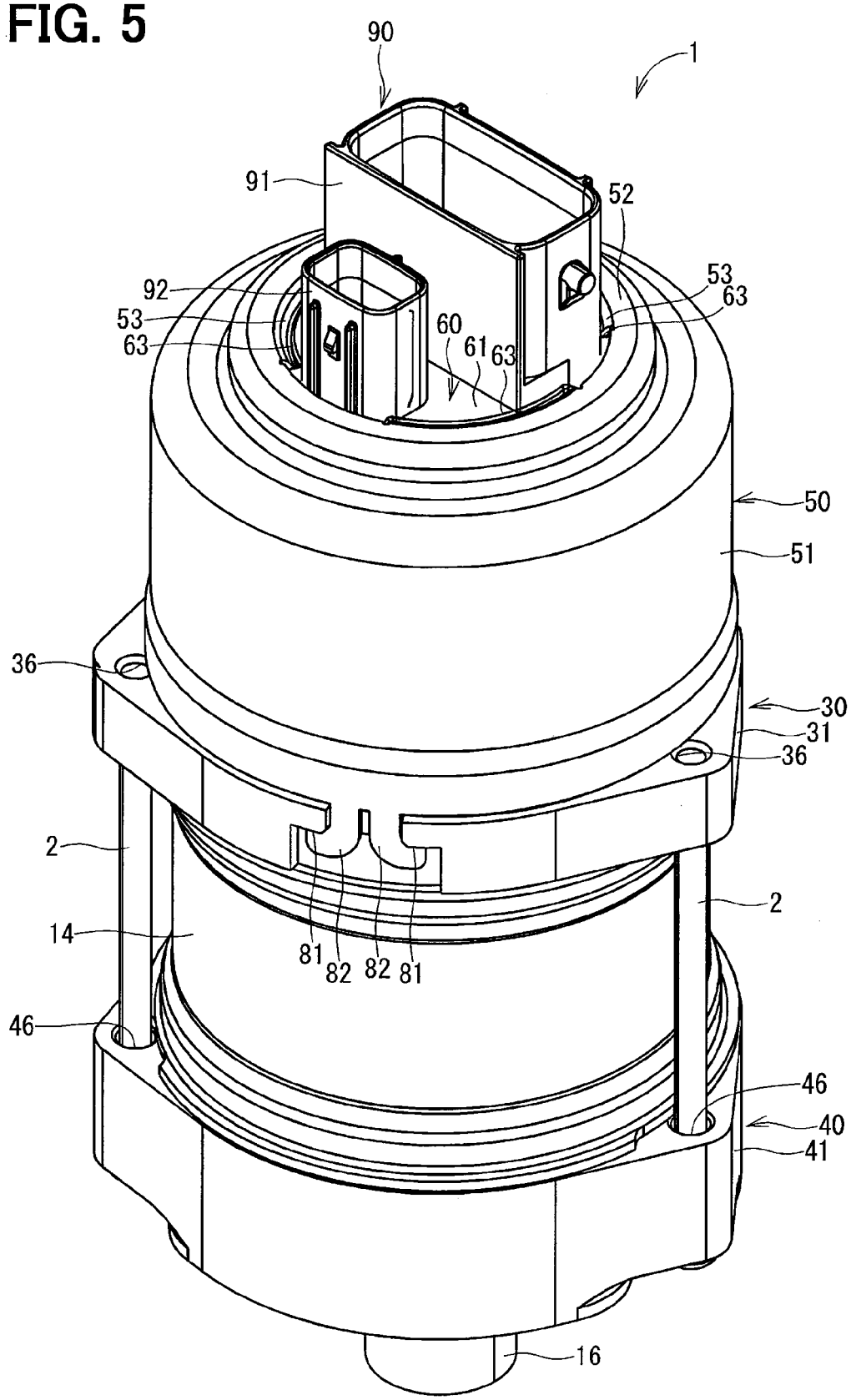
FIG. 5 is a perspective view of the rotating electric machine in the first embodiment of the present disclosure.

A through hole 36 which pierces through the frame body 31 along a board thickness direction is formed on an outer periphery section of the frame body 31 (see FIGS. 3 and 5). That is, the through hole 36 is formed to connect one surface of the frame body 31 facing the controller section 20 and the other surface of the frame body 31 facing the motor section 10. According to the present embodiment, the through hole 36 is bored at three positions along the periphery of the frame body 31. On an outer wall of the cylinder part 37, an annular groove 38 is formed.

The first frame 30 has its cylinder part 34 positioned in an inside of the one end of the motor case 14, which plugs/seals the one end of the motor case 14. In such structure, the sealing member 17 is compressed by the motor case 14 and the cylinder part 34 toward a radial direction of the frame body 31. Thereby, the sealing member 17 is capable of maintaining air/water-tightness between the motor case 14 and the first frame 30.

As shown in FIG. 1, the second frame 40 is disposed on an opposite side of the motor section 10 relative to the first frame 30, and a positioning/arrangement of the first and second frames is interposed with the motor section 10. In other words, the motor section is interposed between the first and second frames. The second frame 40 has a frame body 41, a cylinder part 44 and the like.

The frame body 41 is formed approximately in a cylindrical shape with metal, for example. A hole 42 which pierces through the frame body 41 along a board thickness direction is disposed at the center of the frame body 41. In an inside of the hole 42, a bearing member 43 is disposed coaxially with the frame body 41.

The cylinder part 44 extends from a motor section side surface of the frame body 41 in a cylindrical shape along a board thickness direction of the frame body 41. On an outer wall of the cylinder part 44, an annular groove 45 is formed. In the groove 45, a sealing member 18 is disposed. The sealing member 18 is made with an elastic member such as a rubber, similarly to the sealing member 17, to have an annular shape, and is elastically deformable when an external force is applied thereon.

A through hole 46 which pierces through the frame body 41 along a board thickness direction is formed on an outer periphery section of the frame body 41 (see to FIG. 5). According to the present embodiment, the through hole 46 is bored at three positions along the periphery of the frame body 41 in a corresponding manner to the through holes 36.

The second frame 40 has its cylinder part 44 positioned in an inside of the other end of the motor case 14, which plugs/seals the other end of the motor case 14. In such structure, the sealing member 18 is compressed by the motor case 14 and the cylinder part 44 toward a radial direction of the frame body 41. Thereby, the sealing member 18 is capable of maintaining air/water-tightness between the motor case 14 and the second frame 40.

According to the present embodiment, three bolts 2 are used corresponding to the through holes 36 and 46. The bolt 2 is inserted into the through hole 46 of the second frame 40 so that the first frame 30 and the second frame 40 are fastened together by the bolt 2. Here, one end (i.e., a head) of the bolt 2 is engagingly stopped on one side of the frame body 41, which is a side opposite to the cylinder part 44, and the other end (i.e., an opposite end relative to the head) of the bolt 2 is screw-fastened into the through hole 36 of the frame body 31 (see FIGS. 4 and 5). Thereby, the bolt 2 exerts a predetermined axial force to a fastening portion on the first and second frames 30, 40, i.e., to a position where the first frame 30 and the second frame 40 are fastened by the bolt 2, at which the motor case 14 is held in a bound state in between the two frames.

As shown in FIG. 1, the shaft 15 is supported by the bearing member 33 on one end, and is supported by the bearing member 43 on the other end. Thereby, the shaft 15 and the rotor 13 are supported by the first frame 30 and the second frame 40, and are rotatable in an inside of the stator 11. Here, the other end of the shaft 15 protrudes to be exposed from a side of the second frame 40, which is a side opposite to the motor section 10.

The other end of the shaft 15 serves as an output end 16. The output end 16 is formed with metal, for example, and is rotatably disposed together with the shaft 15. The output end 16 is connected to the speed reduction gear 103 with an input part of the speed reduction gear 103 engaged thereon, and outputs a rotation of the rotor 13 and the shaft 15 to the speed reduction gear 103 (see FIG. 2).

A magnet 19 is disposed on one end of the shaft 15. The magnet 19 is disposed to be rotatable with the shaft 15 on an opposite side of the frame body 31 relative to the motor section 10.

The cover 50 is formed with metal etc., for example, and has a cover body 51, an inner annular part 52, an extension part 53 and the like.

The cover body 51 is formed in a cylindrical shape to cover the controller section 20, with one end extending up to the first frame 30 along an axial direction of the stator 11. The inner annular part 52 is formed in an annular/ring shape to extend in a radial inside direction from the other end of the cover body 51. One end of the cover body 51 abuts an outer wall of the cylinder part 37 of the first frame 30. The extension part 53 is formed to extend from an inner periphery of the inner annular part 52 in a radial inside direction (see FIGS. 1 and 3). In the present embodiment, the extension part 53 is formed at three positions along the periphery of the inner annular part 52 (see FIG. 3).

The lid section 60 is formed with resin etc., for example, and has a lid body part 61 and the like. The lid body part 61 is formed approximately in a circular disk shape, and is disposed in an inside of the cover body 51 to seal the other end of the cover body 51, i.e., is disposed on an opposite side of the controller section 20 relative to the motor section 10. More specifically, the lid body part 61 is disposed, for sealing an opening in an inside of the inner annular part 52 of the cover 50, on one side of the inner annular part 52 close to the controller section 20. Here, the controller section 20 is being fixed onto the first frame 30. Further, the lid body part 61 is being fixed onto the controller section 20.

On a surface on an opposite side of the lid body part 61 relative to the controller section 20, an annular groove 62 is formed. Further, in an inside of the annular groove 62 on the surface on an opposite side of the lid body part 61 relative to the controller section 20, a groove 63 is formed. That is, the lid body part 61 has the groove 63 formed on a surface of the lid section facing the cover. The groove 63 is formed at three positions in a corresponding manner to the extension part 53 (see FIG. 3). The three extension parts 53 are respectively engagingly set in the three grooves 63 (see FIGS. 3 and 5).

The sealing member 71 is formed with an elastic material such as a rubber or the like, and is elastically deformable according to an application of an external force. The sealing member 71 is disposed in the annular groove 62 of the lid section 60. In other words, the sealing member 71 is held in a bound state at a position in between the lid body part 61 of the lid section 60 and the inner annular part 52 of the cover 50.

The sealing member 72 is, similarly to the sealing member 71, formed with an elastic material such as a rubber or the like, and is elastically deformable according to an application of an external force. The sealing member 72 is disposed in the groove 38 of the first frame 30. In other words, the sealing member 72 is held in a bound state at a position in between the cylinder part 37 of the first frame 30 and the one end of the body part 51 of the cover 50.

Figure 4:
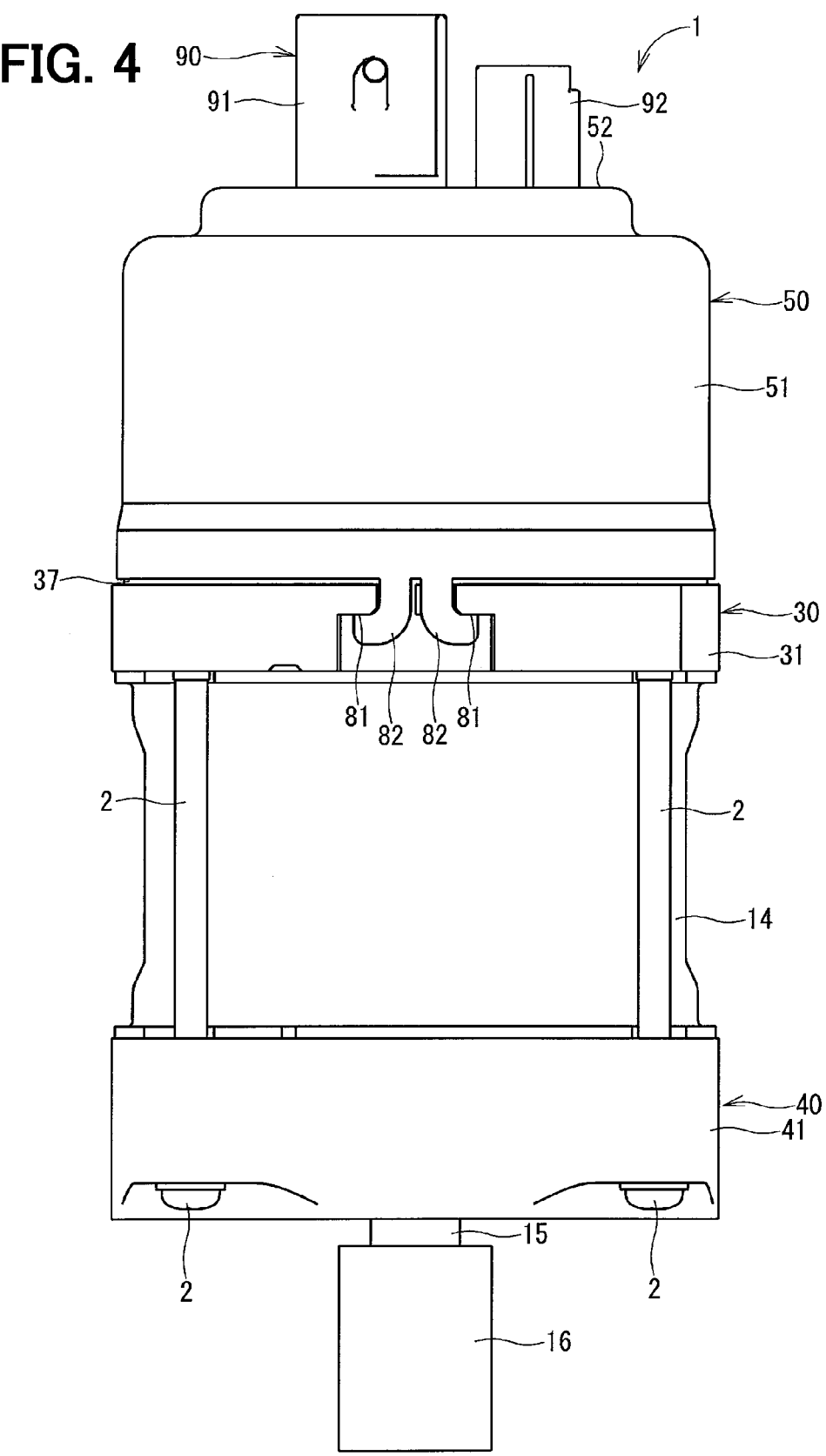
FIG. 4 is a view of the rotating electric machine in FIG. 3 along an arrow IV.

An engagement part 81 is disposed on an outer periphery of the first frame 30, i.e., on an outer wall of the frame body 31 which is disposed in a radial outside side of the frame body 31 (see FIG. 4). According to the present embodiment, two engagement parts 81 makes one set, and two sets thereof are disposed along the periphery of the frame body 31 at respectively different two positions. The two sets of the engagement parts 81 are equi-angularly disposed at an angular interval of 180 degrees on the periphery of the frame body 31.

A claw part 82 is formed to extend from an opposite end of the cover body 51 relative to the inner annular part 52 in an opposite direction that is opposite to an extending direction of the inner annular part 52, to be engageable with the engagement part 81, at positions corresponding to the engagement parts 81. In other words, two claw parts 82 make one set thereof, and two sets of the claw parts 82 are disposed at two positions along the periphery of the cover body 51.

The cover 50 is fixedly disposed onto the first frame 30 when the claw part 82 engages with the engagement part 81.

The cover 50 is, when being fixed onto the first frame 30 by (the engagement of) the claw part 82 and the engagement part 81, pulled toward the motor section 10 relative to the lid section 60. Therefore, the sealing member 71 put in between the lid body part 61 of the lid section 60 and the inner annular part 52 of the cover 50 is compressed in an axial direction of the cover body 51, i.e., is compressed along a direction that is in parallel with an axis of the cover body 51 by the lid body part 61 of the lid section 60 and the inner annular part 52 of the cover 50. Thereby, the sealing member 71 put in between the lid section 60 and the cover 50 provides air-tightness/water-tightness for a gap between the lid section 60 and the cover 50.

Further, when the cover 50 is being fixed onto the first frame 30 by the claw part 82 and the engagement part 81, the sealing member 72 is compressed by the cylinder part 37 of the first frame 30 and the one end of the cover body 51 of the cover 50 in a radial direction of the cover body 51, i.e., in a perpendicular-to-axis direction of the cover body 51. Thereby, the sealing member 72 provides air-tightness/water-tightness for a gap between the first frame 30 and the cover 50.

Here, the sealing member 71 corresponds to a "first sealing member" in claims. The sealing member 72 corresponds to a "second sealing member" in claims. The engagement part 81 and the claw part 82 correspond to a "fastener" in claims.

In the present embodiment, the extension part 53 of the cover 50 is configured to engage with the groove 63 of the lid section 60 as mentioned above. Therefore, even when the cover 50 is pulled toward the motor section 10 relative to the lid section 60 by the engagement of the engagement part 81 and the claw part 82, a radially-outwardly expanding deformation of the inner annular part 52 relative to the lid section 60 and a shifting movement of the cover body 51 toward the motor section 10 relative to the lid section 60 are respectively prevented.

The connector 90 has a first connector 91 and a second connector 92 which are formed with resin, etc., in one body with the lid section 60, for example.

The first connector 91 and the second connector 92 are seamlessly formed on the lid body part 61 of the lid section 60 so that they extend in a cylindrical shape from the lid body part 61 in a direction away from the controller section 20, respectively. To the connector 90, an end of a wire harness 3 is connected. To the first connector 91, an end of an electric power wire harness 4 for supplying an electric power to the winding wire 12 and an end of a control wire harness 5 for transmitting a signal to the controller section 20 are connected. To the second connector 92, an end of a control wire harness 6 for transmitting a signal to the controller section 20 is connected. In the present embodiment, the control wire harness 6 transmits a signal from the torque sensor 104 to the controller section 20.

Next, the controller section 20 is described in detail.

As shown in FIG. 1, the controller section 20 has a heat sink 21, a semiconductor module 22, a power board 23, a control board 24, a capacitor 25, a choke coil 26, a microcomputer 27, a rotation angle sensor 28 and the like.

The heat sink 21 is formed in a closed-end box-like shape, for example with metal, such as aluminum. The heat sink 21 is fixed onto the first frame 30 so that its bottom faces the first frame 30 and its opening opposite to its bottom faces the lid section 60.

Multiple pieces of the semiconductor modules 22 are disposed so that those modules 22 abut the outer wall of the heat sink 21. The semiconductor module 22 may be a switching device, such as an IGBT, for example, for the switching of an electric power supply to the winding wire 12. By disposing the semiconductor module 22 in an abutting manner to the heat sink 21, heat of the semiconductor module 22 in operation is dissipated to air via the heat sink 21.

The power board 23 is disposed at a position between the heat sink 21 and the lid section 60 so that the opening of the heat sink 21 is sealed by the power board 23. The power board 23 is electrically connected with the semiconductor module 22. The semiconductor module 22 is electrically connected with the winding wire 12. A driving current to the winding wire 12 flows through the power board 23.

The control board 24 is disposed at a position between the heat sink 21 and the first frame 30, which is on an opposite side of the heat sink 21 relative to the power board 23. The control board 24 is electrically connected with the semiconductor module 22. The control signal which controls the semiconductor module 22 flows through the control board 24.

The capacitor 25 is accommodated in an inside of the heat sink 21. The capacitors 25 are a through-hole type electronic component, and are mounted on one side of the heat sink 21 close to the power board 23, for example. According to the present embodiment, multiple capacitors 25 are used. The capacitor 25 is used for a reduction of a ripple current in the drive electric current, i.e., for achieving a noise prevention function of the motor.

The choke coil 26 is, just like the capacitor 25, accommodated in an inside of the heat sink 21. The choke coil 26 is mounted on one side of the power board 23 close to the heat sink 21. The choke coil 26 functions as a filter, and removes a noise in an electric power supply current.

A metal terminal buried in the connector 90 is electrically connected to the power board 23 and to the control board 24.

The first connector 91 receives an electric current that is to be supplied to the winding wire 12 via the electric power wire harness 4, that is, a driving electric current. In this case, the driving electric current flows into the winding wire 12 via the first connector 91, the power board 23, and the semiconductor module 22.

Control signals to the control board 24, such as a signal from the torque sensor 104, a signal about an ignition voltage, together with a CAN signal and the like are input to the first connector 91 and to the second connector 92 via the control wire harnesses 5, 6.

The microcomputer 27 and the rotation angle sensor 28 are mounted on one side of the control board 24 facing the frame body 31, i.e., on an opposite side of the control board 24 relative to the heat sink 21.

The microcomputer 27 has a CPU as a calculating unit, a ROM and a RAM as a memory, as well as an input output unit, etc., based on the signal from the torque sensor 104, the signal about the ignition voltage, other CAN signals, etc., that are input via the connector 90, the microcomputer 27 performs various operations according to the program stored in ROM, and controls the power supply to the winding wire 12 based on a control of the semiconductor module 22. When an electric power is supplied to the winding wire 12, a rotating magnetic field is generated by the stator 11. Thereby, the rotor 13 rotates together with the shaft 15, and a rotation of the rotor 13 is outputted from the output end 16. Thus, the rotating electric machine 1 is a rotating electric machine in one body structure having a controller, in which the motor section 10 and the controller section 20 for controlling the drive of the motor section 10 are combined to have one body.

The rotation angle sensor 28 is disposed at a position corresponding to the magnet 19 on the control board 24, i.e., on an axis line of the shaft 15. The rotation angle sensor 28 detects a rotation angle of the shaft 15 and the rotor 13 by detecting the magnetic flux from the magnet 19. The rotation angle sensor 28 outputs a signal about the rotation angle of the shaft 15 and the rotor 13 to the microcomputer 27. Thereby, the microcomputer 27 controls a rotation of the rotor 13 without losing a smooth rotation cycle thereof (i.e., without losing synchronicity to the switching of the electric power).

As described above, in the present embodiment, the motor section 10 has an annular shape stator 11, the winding wire 12 that is wound on the stator 11, and the rotor 13 that is rotatably disposed in an inside of the stator 11. The shaft 15 is disposed at the center of rotation of the rotor 13. The controller section 20 is provided in an axial outside area of the stator 11, i.e., a part of the motor section 10, and controls a drive of the motor section 10 by controlling a supply of the electric power to the winding wire 12.

The first frame 30 frame is disposed in between the stator 11 and the controller section 20. The second frame 40, together with the first frame 30, "binds" the motor section 10. The cover 50 has the cover body 51, and one end of the cover body 51 extends to cover the control section 20, the extension of the cover body 51 having a cylindrical shape reaches the first frame 30 along the axis of the stator 11.

The lid section 60 in an inside of the cover body 51 is disposed on the opposite side of the controller section 20 relative to the motor section 10 so that the other end of the cover body 51 is sealed by the lid section. The sealing member 71 in an annular shape is disposed in the compressed state between the lid section 60 and the other end of the cover body 51, for airtight/watertight sealing of the gap between the lid section 60 and the cover 50. The sealing member 72 in an annular shape is also disposed in the compressed state between the first frame 30 and the one end of the cover body 51, with the compression direction of the sealing member 72 being different from the compression direction of the sealing member 71, for airtight/watertight sealing of the gap between the first frame 30 and covers 50. The engagement part 81 and the claw part 82 enables the fixation of the first frame 30 frame onto the cover 50, while holding the sealing member 71 and the sealing member 72 in the compressed state.

Thus, the controller section 20 is at least covered by the cylindrical shaped cover 50 in the present embodiment. Further, the both ends of the cover 50 are sealed by the lid section 60 or the first frame 30, either with the sealing member 71 or the sealing member 72 for the air-tightness or water-tightness. Therefore, intrusion of dust, water, etc., into the controller section 20 is effectively prevented by the cover 50, the sealing member 71, and the sealing member 72. Thus, dust-proofing, water-proofing and rust prevention are realized by a simple structure of the present embodiment.

According to the present embodiment, the sealing member 71 and the sealing member 72 are disposed in the compressed state in respectively different directions. Therefore, both the sealing member 71 and the sealing member 72 will not be jointly affected by stress, twisting force, or the like that may occur during the course of assembly. That is, a single assembly error is unlikely to damage both sealing members 71, 72 since the compressed states of sealing members 71, 72 are in different directions. Therefore, the dust-proofing and the water-proofing of the sealing member 71 and the sealing member 72 are not compromised due to such an assembly error.

In the present embodiment, the sealing member 71 is disposed so to be compressed in a direction that is in parallel with the axis of the cover body 51, and the sealing member 72 is disposed to be compressed in a direction that is perpendicular to the axis of the cover body 51. Thus, the sealing member 71 and the sealing member 72 are disposed respectively in the different states, i.e., respectively compressed toward different directions.

In the present embodiment, the cover 50 has the inner annular part 52 that extends from the other end of the cover body 51 to a radial inside of the cover body 51. The sealing member 71 is disposed in between the lid section 60 and the inner annular part 52. The sealing member 72 is disposed in between the first frame 30 and the one end of the cover body 51.

In the present embodiment, the engagement part 81 formed on the outer periphery of the first frame 30 and the claw part 82 extending from the one end of the cover body 51 to engage the engagement part 81 respectively correspond to a "fastener" in the claims.

In the present embodiment, the lid section 60 has the groove 63 formed on the opposite side relative to the controller section 20. The cover 50 has the extension part 53 formed to engage the groove 63. Thus, by the engagement of the extension part 53 with the groove 63, even when the cover 50 is in a pulled state toward the motor section 10 relative to the lid section 60 by the engagement of the engagement part 81 with the claw part 82, the radially-outwardly expanding deformation of the inner annular part 52 relative to the lid section 60 and a shifting movement of the cover body 51 toward the motor section 10 relative to the lid section 60 are respectively prevented.

In the present embodiment, the connector 90 is provided. The connector 90 is formed to extend from the lid section 60 in the direction away from the controller section 20. To the connector 90, the electric power wire harness 4 for supplying an electric power to the winding wire 12 as well as the control wire harnesses 5 and 6 for transmitting a signal to the controller section 20 are connected. Thus, in the present embodiment, the connector 90 for connecting to the electric power wire harness 4 that supplies an electric power to the winding wire 12 and for connecting to the control wire harnesses 5, 6 for transmitting a signal to the controller section 20 is formed to extend from the lid section 60 in the axial direction of the stator 11. Therefore, the size of the rotating electric machine 1 including the connector 90 along the radial direction of the stator 11 is reduced.

Second Embodiment

The rotating electric machine in the second embodiment of the present disclosure is shown in FIGS. 6-9. In the second embodiment, how the cover is fixed and other portions are different from the first embodiment.

According to the second embodiment, the first frame 30 does not have the engagement part 81, which was formed thereon in the first embodiment. Further, the cover body 51 does not have the claw part 82, which was formed thereon in the first embodiment. Further, in an inside of the inner annular part 52 of the cover 50, there is no extension part 53, which was formed thereon in the first embodiment. Further, on an inside of the annular groove 62 on the lid section 60, there is no groove 63, which was formed in the first embodiment.

Figure 6:
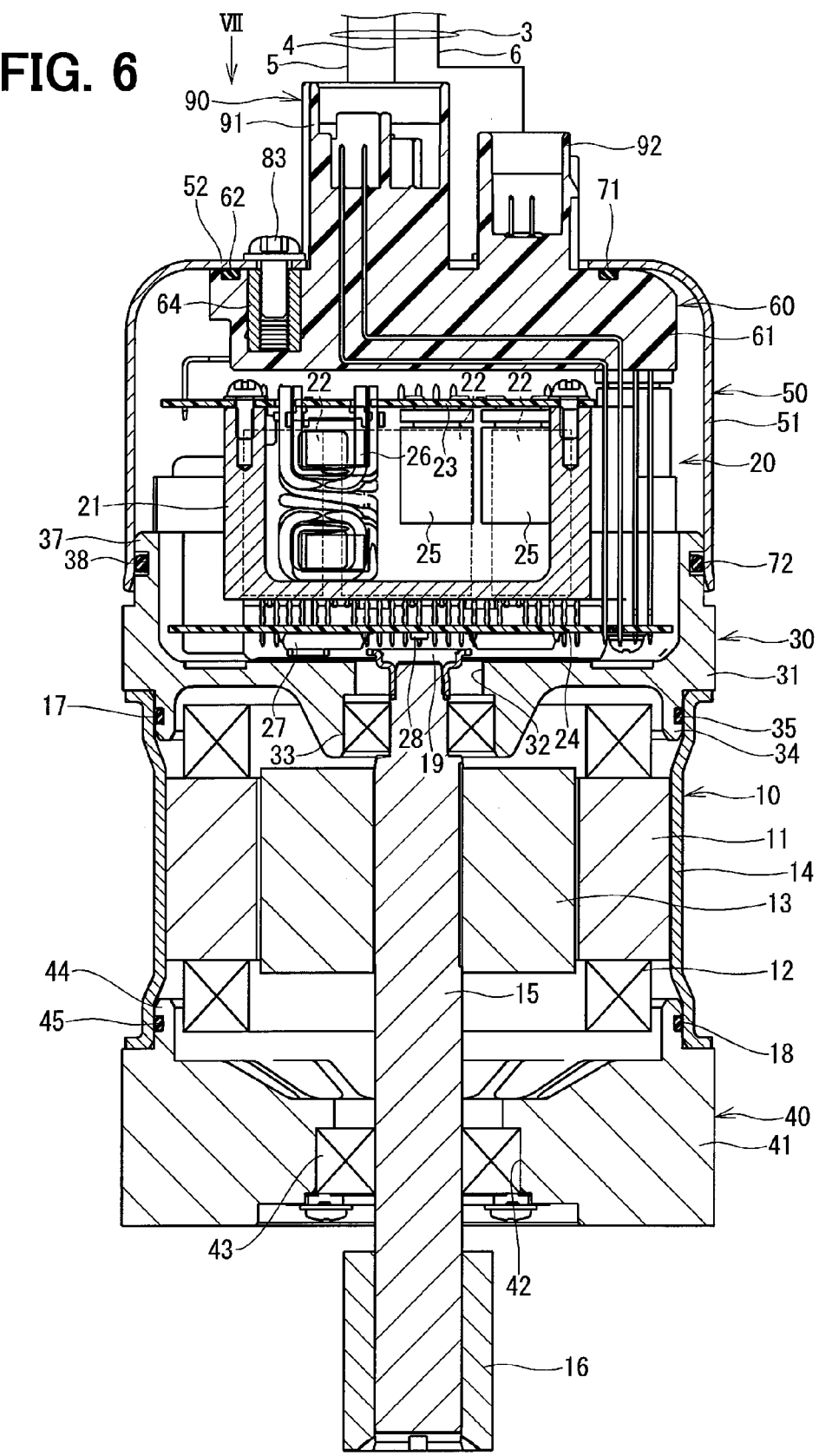
FIG. 6 is a sectional view of the rotating electric machine in a second embodiment of the present disclosure.
Figure 7:
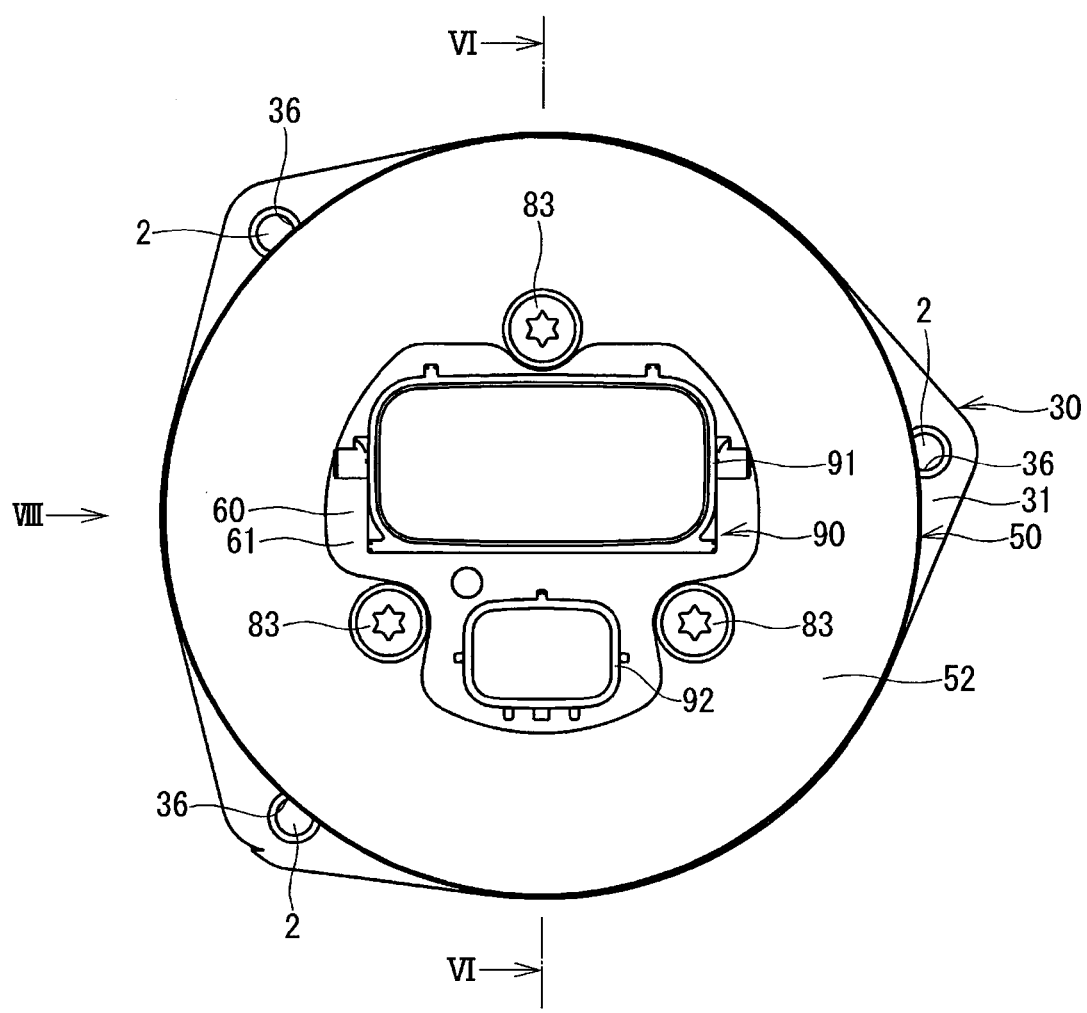
FIG. 7 is a view of the rotating electric machine in FIG. 6 along an arrow VII.
Figure 8:
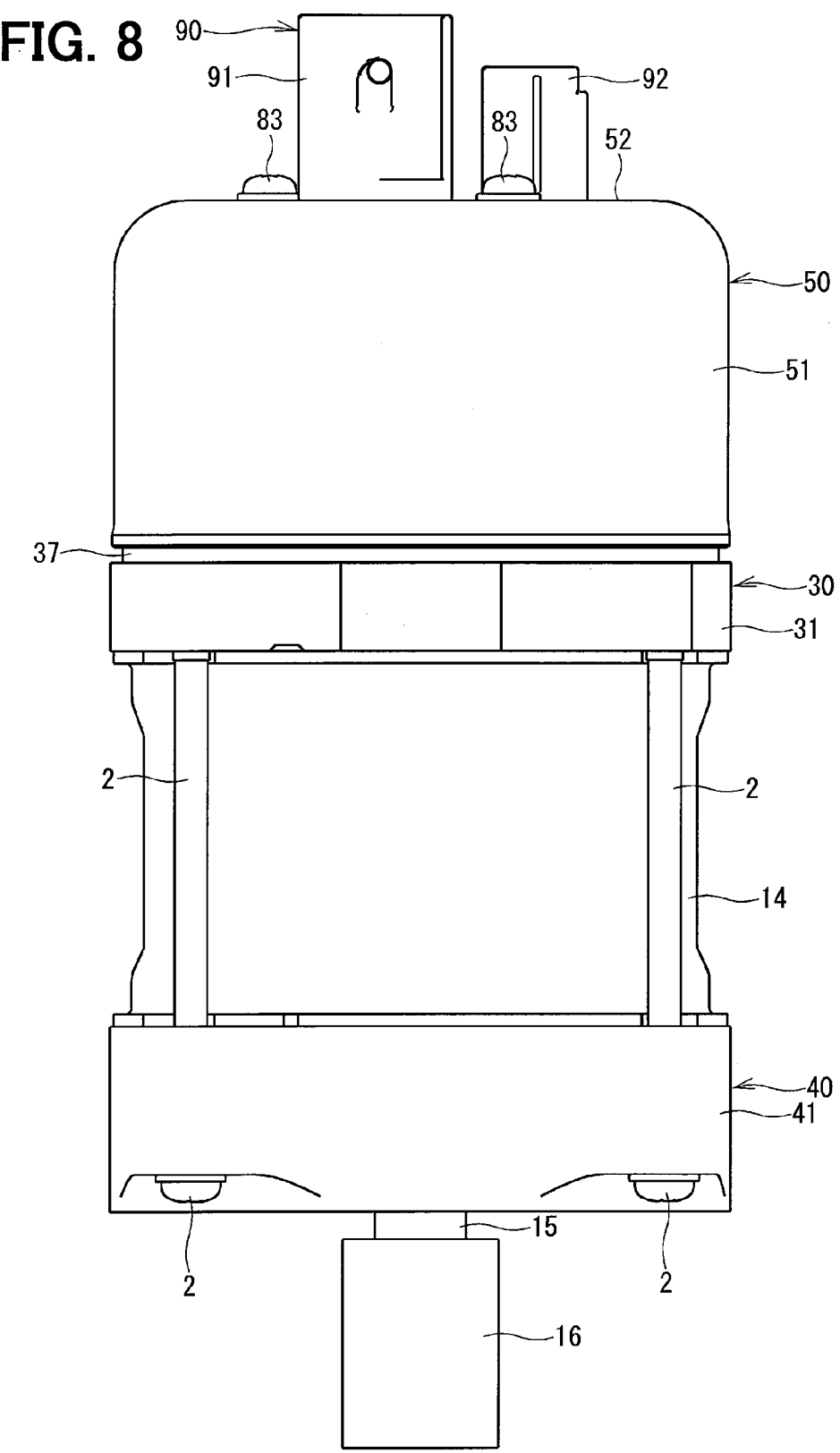
FIG. 8 is a view of the rotating electric machine in FIG. 7 along an arrow VIII.
Figure 9:
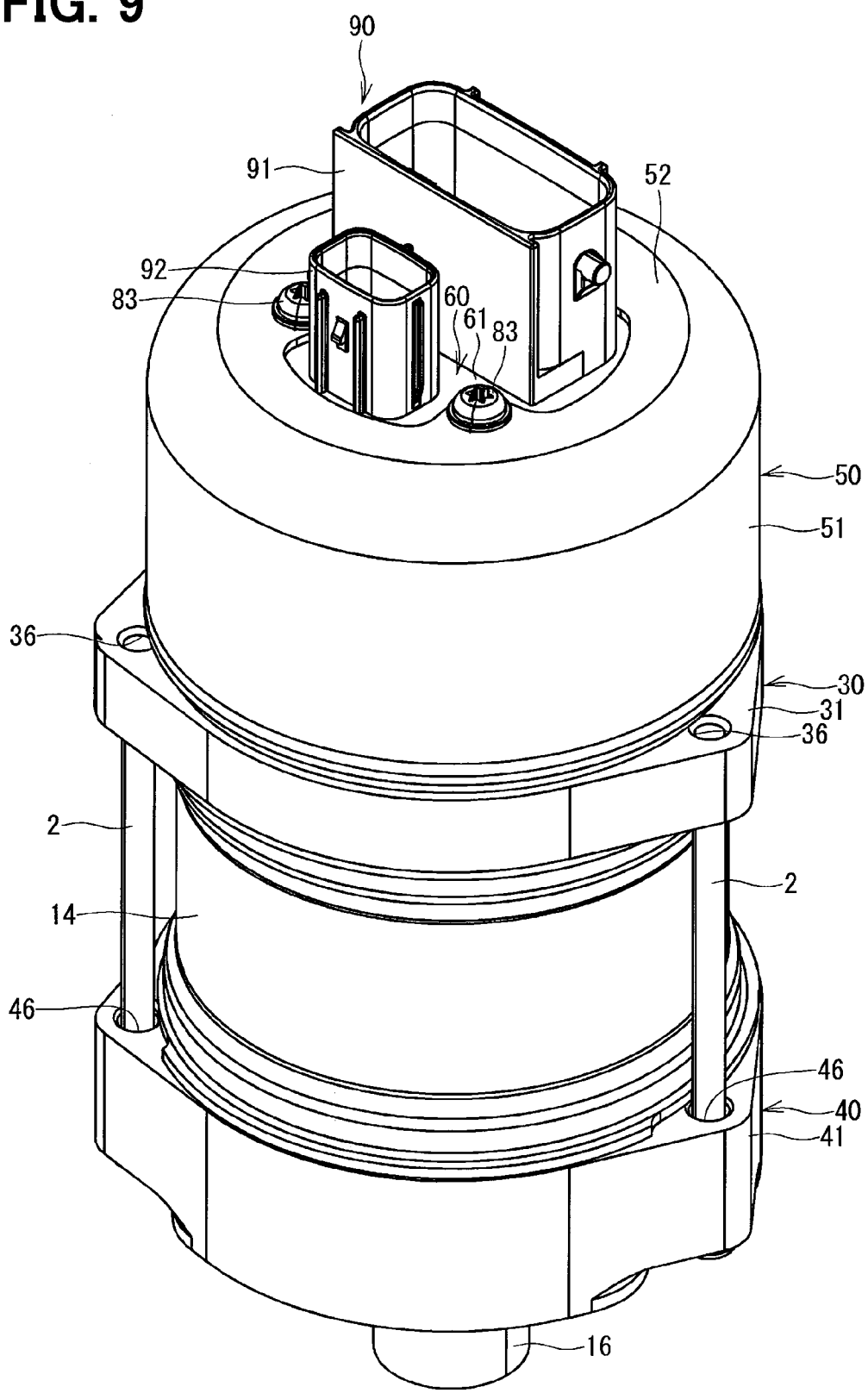
FIG. 9 is a perspective view of the rotating electric machine in the second embodiment of the present disclosure.

According to the second embodiment, a metal cylinder member 64 is buried in the lid body part 61 of the lid section 60 (see FIG. 6). In the present embodiment, the cover 50 is being fixed onto the lid section 60 with a fixation of the inner annular part 52 on the lid main part 61 by using a screw member 83. The screw member 83 is screw-fastened into the cylinder member 64 that is buried in the lid body part 61, for the fixation of the cover 50 onto the lid section 60. In the present embodiment, three screw members 83 are used (see FIG. 7). Here, the sealing member 71 is compressed in a "parallel" direction in parallel with the axis of the cover body 51 by the lid body part 61 and by the inner annular part 52. Thereby, the sealing member 71 achieves air-tightness or water-tightness between the lid section 60 and the cover 50.

Further, when the cover 50 is fixed onto the lid section 60 by the screw member 83, the sealing member 72 is compressed in a "perpendicular" direction that is perpendicular to the axis of the cover body 51 by the cylinder part 37 of the first frame 30 and by the one end of the cover body 51 of the cover 50. Thereby, the sealing member 72 achieves air-tightness or water-tightness between the first frame 30 and the cover 50.

In the above, an inner diameter of a hole that is bored on the inner annular part 52 of the cover 50, into which a shaft portion of the screw member 83 is inserted, is configured to be greater than an outer diameter of the shaft portion of the screw member 83 (see FIG. 6). Therefore, the cover 50 is movable along a surface of the lid body part 61 relative to the lid section 60, for an adjustment so that the cylinder part 37 of the first frame 30 is coaxially aligned with the cover body 51.

Here, the screw member 83 corresponds to a "fastener" in the claims.

The other configurations in the second embodiment other than the above are the same as that of the first embodiment.

As described above, in the present embodiment, the screw member 83 which fixes the cover 50 onto the lid section 60 corresponds to a "fastener". According to the second embodiment, although the number of parts is increased in comparison to the first embodiment by the use of the "fastener", the outer periphery of the frame body 31 and the one end of the cover body 51 are configured to have a simple shape, by slashing/omitting the engagement part 81 and the claw part 82.

Third Embodiment

Figure 10:
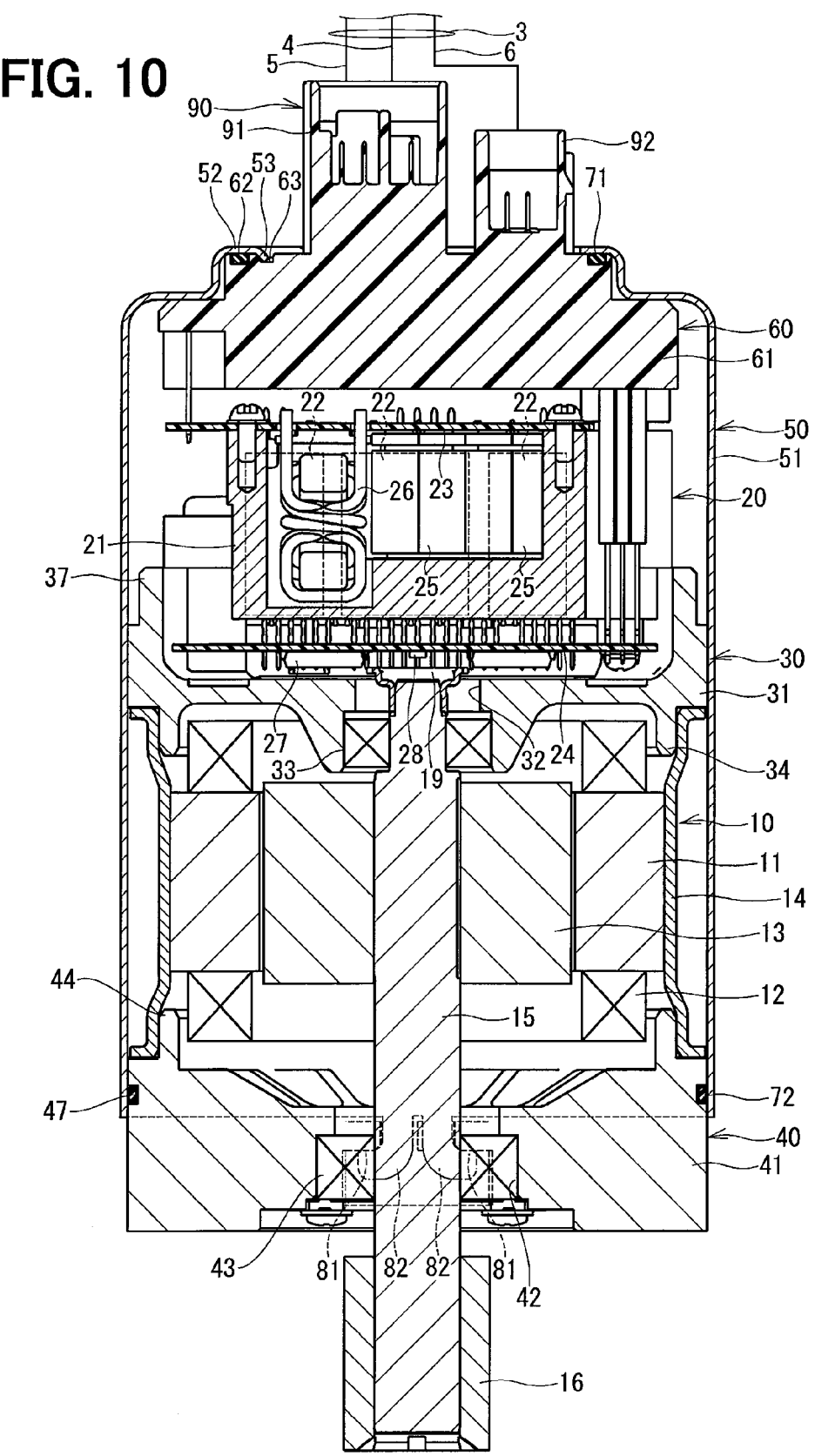
FIG. 10 is a sectional view of the rotating electric machine in a third embodiment of the present disclosure.

The rotating electric machine in the third embodiment of the present disclosure is shown in FIG. 10. In the third embodiment, the shape of the cover and other configuration are different from the first embodiment.

In the third embodiment, one end of the cover body 51 extends down to the second frame 40 along the axial direction of the stator 11, and covers the controller section 20 and the motor section 10. Here, an inner wall of the cover body in the middle of such extension along the stator axis abuts an outer wall of the frame body 31 of the first frame 30, which (i.e., the outer wall) is on a radial outside of the frame body 31. An inner wall of the one end of the cover body 51 abuts an outer wall of the frame body 41 of the second frame 40, which is on a radial outside of the frame body 41.

According to the third embodiment, the groove 38 shown in the first embodiment is not formed on the cylinder part 37 of the first frame 30. On the other hand, an annular groove 47 is formed on the outer wall of the frame body 41 of the second frame 40, which is on the radial outside of the frame body 41. In the groove 47, the sealing member 72 serving as a "second sealing member" is disposed. In other words, the sealing member 72 is put in a bound state in between the frame body 41 of the second frame 40 and the one end of the cover body 51 of the cover 50.

The engagement part 81 is formed on the outer periphery of the second frame 40, i.e., on the outer wall on a radial outside of the frame body 41 (see FIG. 10). In the present embodiment, two engagement parts 81 make one set/group, and two sets of the engagement parts 81 are positioned along the periphery of the frame body 41 at respectively different two positions. The two sets of the engagement parts 81 are equi-angularly disposed at an angular interval of 180 degrees on the periphery of the frame body 41.

The claw part 82 is formed to extend from an opposite end of the cover body 51 relative to the inner annular part 52 in an opposite direction that is opposite to an extending direction of the inner annular part 52, to be engageable with the engagement part 81, at positions corresponding to the engagement parts 81. In other words, two claw parts 82 make one set thereof, and two sets of the claw parts 82 are disposed at two positions along the periphery of the cover body 51.

The cover 50 is fixedly disposed and attached onto the second frame 20 when the claw part 82 engages with the engagement part 81.

The cover 50 is, when being fixed onto the second frame 40 by the engagement of the claw part 82 and the engagement part 81, pulled toward the motor section 10 relative to the lid section 60. Therefore, similarly to the first embodiment, the sealing member 71 put/bound in between the lid body part 61 of the lid section 60 and the inner annular part 52 of the cover 50 is compressed in a "parallel" direction that is in parallel with an axis of the cover body 51 by the lid body part 61 of the lid section 60 and the inner annular part 52 of the cover 50. Thereby, the sealing member 71 put in between the lid section 60 and the cover 50 achieves air-tightness/water-tightness for a gap between the lid section 60 and the cover 50.

Further, when the cover 50 is being fixed onto the second frame 40 by the claw part 82 and the engagement part 81, the sealing member 72 is compressed by the frame body 41 of the second frame 40 and the one end of the cover body 51 of the cover 50 in a perpendicular-to-axis direction of the cover body 51. Thereby, the sealing member 72 achieves air-tightness/water-tightness for a gap between the second frame 40 and the cover 50.

In the present embodiment, air-tightness/water-tightness between an outside and inside of the cover 50 is achieved by the sealing members 71 and 72, without having the annular grooves 35 and 45 on the cylinder part 34 and cylinder part 44 and without disposing the sealing members 17 and 18, which were shown in the first embodiment.

Other configurations other than the above are the same as the first embodiment.

As described above, in the present embodiment, the one end of the cover body 51 extends to reach the second frame 40. Therefore, in addition to the controller section 20, the motor section 10 is also covered by the cover 50. Thereby, intrusion of dust, water, etc., is prevented not only for the controller section 20 but also for the motor section 10.

Fourth Embodiment

Figure 11:
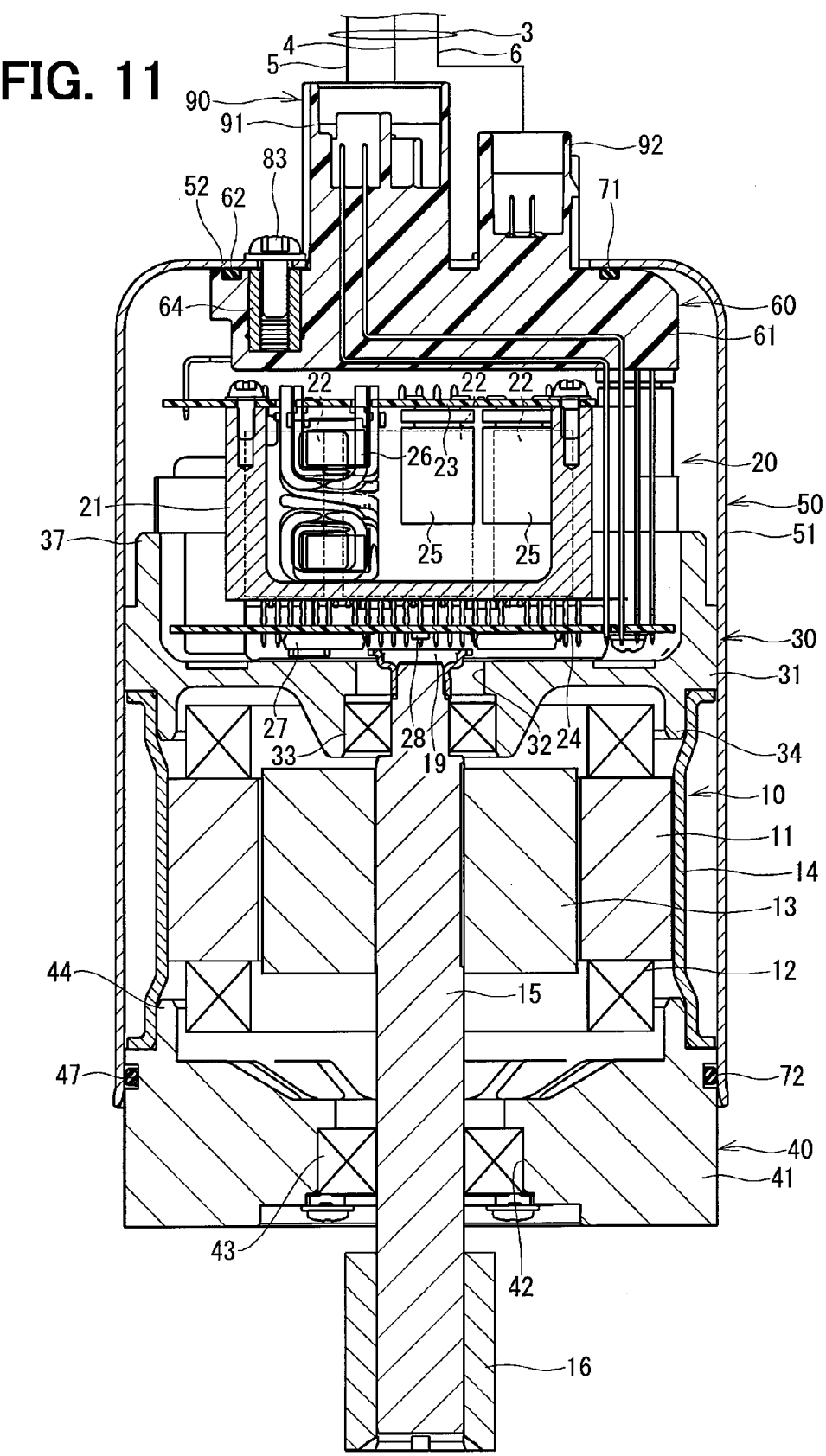
FIG. 11 is a sectional view of the rotating electric machine in a fourth embodiment of the present disclosure.

The rotating electric machine in the fourth embodiment of the present disclosure is shown in FIG. 11. In the fourth embodiment, the shape of the cover and other configurations are different from the second embodiment.

In the fourth embodiment, one end of the cover body 51 extends to the second frame 40 along the axial direction of the stator 11, and covers the controller section 20 and the motor section 10. Here, an inner wall of the cover body in the middle of such extension along the stator axis abuts an outer wall of the frame body 31 of the first frame 30, which (i.e., the outer wall) is on a radial outside of the frame body 31. An inner wall of the one end of the cover body 51 abuts an outer wall of the frame body 41 of the second frame 40, which is on a radial outside of the frame body 41.

According to the fourth embodiment, the groove 38 shown in the first embodiment is not formed on the cylinder part 37 of the first frame 30. On the other hand, the annular groove 47 is formed on the outer wall of the frame body 41 of the second frame 40, which is on the radial outside of the frame body 41. In the groove 47, the sealing member 72 serving as a "second sealing member" is disposed. In other words, the sealing member 72 is put in a bound state in between the frame body 41 of the second frame 40 and the one end of the cover body 51 of the cover 50.

When the cover 50 is fixed onto the lid section 60 by the screw member 83, the sealing member 72 is compressed in a radial direction of the cover body 51, i.e., in a "perpendicular" direction that is perpendicular to the axis of the cover body 51 by the frame body 41 of the second frame 40 and by the one end of the cover body 51 of the cover 50. Thereby, the sealing member 72 achieves air-tightness or water-tightness between the second frame 40 and the cover 50.

In the present embodiment, air-tightness/water-tightness between an outside and inside of the cover 50 is achieved by the sealing members 71 and 72, without having the annular grooves 35 and 45 on the cylinder part 34 and cylinder part 44 and without disposing the sealing members 17 and 18, which were shown in the second embodiment.

In the above, an inner diameter of a hole that is bored on the inner annular part 52 of the cover 50, into which a shaft portion of the screw member 83 is inserted, is configured to be greater than an outer diameter of the shaft portion of the screw member 83 (see FIG. 11). Therefore, the cover 50 is movable along a surface of the lid body part 61 relative to the lid section 60, for an adjustment so that the frame body 31 of the first frame 30 and the frame body 41 of the second frame 40 are coaxially aligned with the cover body 51.

The other configurations in the fourth embodiment other than the above are the same as that of the second embodiment.

As described above, in the present embodiment, the one end of the cover body 51 extends to reach the second frame 40. Therefore, in addition to the controller section 20, the motor section 10 is covered by the cover 50. Thereby, intrusion of dust, water, etc., is prevented not only for the controller section 20 but also for the motor section 10.

Fifth Embodiment

Figure 12:
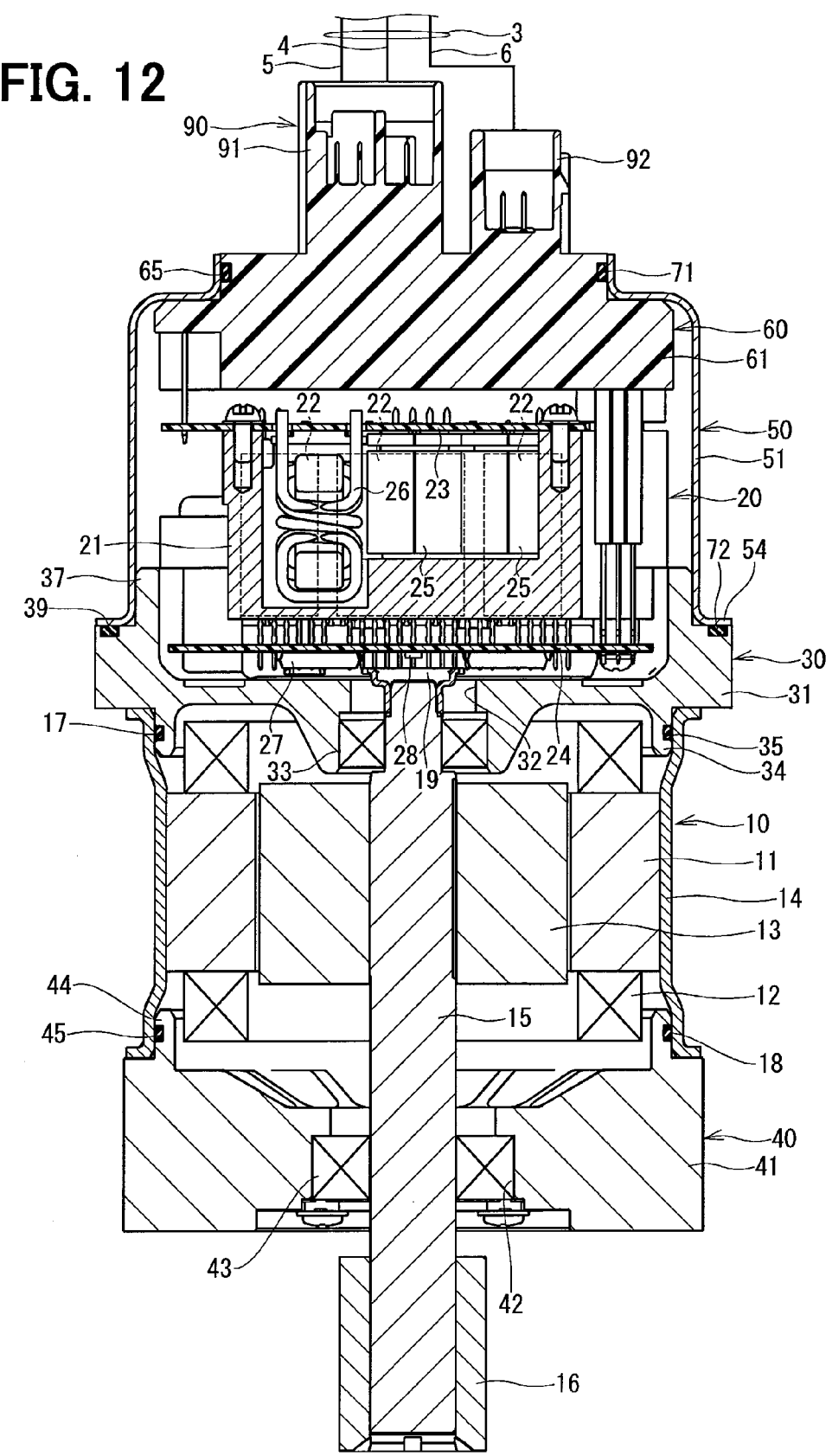
FIG. 12 is a sectional view of the rotating electric machine in a fifth embodiment of the present disclosure.

The rotating electric machine in the fifth embodiment of the present disclosure is shown in FIG. 12. In the fifth embodiment, the shape of the cover and other configurations are different from the first embodiment.

According to the fifth embodiment, the cover 50 does not have the inner annular part 52 and the extension part 53 that are shown in the first embodiment. On the other hand, the cover 50 has an outer flange 54. The outer flange 54 is annularly formed to extend from the one end of the cover body 51 toward a radial outside thereof (see FIG. 12). The outer flange 54 is abuttable to one surface of the frame body 31 of the first frame 30, which is on a cylinder part 37 side of the first frame 30.

Further, in the fifth embodiment, the lid body part 61 of the lid section 60 does not have the annular groove 62 shown in the first embodiment. On the other hand, an annular groove 65 is formed on an outer wall of the lid body part 61, which is on a radial outside of the lid body part 61. In the groove 65, the sealing member 71 serving as a "first sealing member" is disposed. In other words, the sealing member 71 is put in a bound state between the lid body part 61 of the lid section 60 and the other end of the cover body 51 of the cover 50.

Further, in the fifth embodiment, the cylinder part 37 of the first frame 30 does not have the groove 38 shown in the first embodiment. On the other hand, an annular groove 39 is formed on one surface of the frame body 31, which is a cylinder part 37 side of the frame body 31. In the groove 39, the sealing member 72 serving as a "second sealing member" is disposed. In other words, the sealing member 72 is put in a bound state between the frame body 31 of the first frame 30 and the outer flange 54 of the cover 50.

Although not illustrated in the fifth embodiment, similarly to the first embodiment, the engagement part 81 is formed on the outer wall of the first frame 30, i.e., on the outer periphery of the frame body 31, which is on a radial outside of the frame body 31.

The claw part 82 is formed to extend, i.e., from the outer flange 54, in an opposite direction that is opposite to an extending direction of the inner annular part 52, to be engageable with the engagement part 81, at positions corresponding to the engagement parts 81.

The cover 50 is being fixed onto the first frame 30 when the claw part 82 engages with the engagement part 81.

The cover 50 is, when fixed onto the first frame 30 by the claw part 82 and the engagement part 81, pulled toward the motor section 10 relative to the first frame 30. Therefore, the sealing member 72 put in a bound state between the frame body 31 of the first frame 30 and the outer flange 54 of the cover 50 is compressed in a "parallel" direction that is in parallel with the axis of the cover body 51 by the frame body 31 of the first frame 30 and the outer flange 54 of the cover 50. Thereby, the sealing member 72 achieves air-tightness or water-tightness for a gap between the first frame 30 and the cover 50.

Further, when the cover 50 is being fixed onto the first frame 30 by the claw part 82 and the engagement part 81, the sealing member 71 is compressed in a radial direction of the cover body 51, i.e., in a "perpendicular" direction that is perpendicular to the axis of the cover body 51, by the other end of the lid body part 61 of the lid section 60 and the other end of the cover body 51 of the cover 50. Thereby, the sealing member 71 achieves air-tightness or water-tightness for a gap between the lid section 60 and the cover 50.

Other configurations other than the above in the fifth embodiment are the same as the first embodiment.

As described above, in the present embodiment, the sealing member 71 serving as a "first sealing member" is disposed to be compressed in the perpendicular direction relative to the axis of the cover body 51. The sealing member 72 serving as a "second sealing member" is disposed to be compressed in the parallel direction relative to the axis of the cover body 51. Thus, the sealing member 71 and the sealing member 72 are put in a compressed state, with their directions of compression configured to be different from each other.

Further, in the present embodiment, the cover 50 has the outer flange 54 annularly formed to extend from the one end of the cover body 51 toward the radial outside thereof. The sealing member 71 is disposed between the lid section 60 and the other end of the cover body 51. The sealing member 72 is disposed between the first frame 30 and the outer flange 54.

Thus, in the present embodiment, the sealing member 71 and the sealing member 72 are put in a state in which they are compressed in the mutually different directions. Therefore, similarly to the first embodiment, the sealing member 71 and the sealing member 72 will not be evenly affected by the stress, the twisting force, or the like in the course of assembly. That is, the same assembly error does not damage both of the two sealing members. Therefore, the dust-proofing and the water-proofing of the sealing member 71 and the sealing member 72 are prevented from deteriorating due to such assembly error.

OTHER EMBODIMENTS

According to other embodiments of the present disclosure, the engagement part, the claw part, and the screw member as a fastener may be disposed in as many positions as the situation allows in one rotating electric machine. Further, the screw member, as a "fastener", may fasten not only the cover and/onto the lid section but also fasten the cover and/onto the first frame or the second frame. Further, as long as the first sealing member and the second sealing member are kept in a compressed state, a "fastener" may be any component for fixedly disposing/attaching the cover onto one of the first frame, the second frame, or the lid section, other than the engagement part, the claw part, or the screw member.

Further, in other embodiments of the present disclosure, the cover may have one end of the cover body to extend to the second frame, and may also have the outer flange that extends from the one end of the cover body toward a radial outside in an annular shape. In such case, the second sealing member is disposed at a position between the second frame and the outer flange.

Further, in other embodiments of the present disclosure, the motor case 14 and the first frame 30 or the second frame 40 may be combined to have one body. In such case, the bolt 2 for fastening the first frame 30 onto the second frame 40 may be saved.

In other embodiments of the present disclosure, when one end of the cover body is configured to extend to the second frame, the motor section 10 does not have to have the motor case 14. Even when the motor section 10 does not have the motor case 14, intrusion of dust, water, etc., into to the motor sections 10 is prevented by the cover body 51 of the cover 50.

Further, in other embodiments of the present disclosure, a connector that extends toward an opposite direction that is opposite to the controller section may be omissible.

In other embodiments of the present disclosure, various components may be used to constitute the controller section 20, including not only the component parts such as the heat sink 21, the semiconductor module 22, etc., mentioned above, but also other parts other than the above.

The present disclosure may also be used as a driving power source for other devices, i.e., devices other than the electric power steering device.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A rotating electric machine comprising:
   a motor section including an annular stator, a winding wire wound on the stator, and a rotor rotatably disposed inside the stator;
   a shaft disposed at a center of rotation of the rotor;
   a controller section disposed in an axially non-overlapping position with the stator and controlling a supply of electric power to the winding wire which provides a drive control of the motor section;
   a first frame disposed between the motor section and the controller section;
   a second frame disposed on a side of the motor section opposite to the first frame, in which the motor section is interposed between the first frame and the second frame;
   a cover having a cover body with a cylindrical shape that extends in an axial direction of the stator toward (i) one end of the cover body and (ii) the first frame or the second frame, the cover covering at least the controller section;
   a lid section disposed on a side of the controller section opposite to the motor section and inside of the cover body, the lid section sealing an other end of the cover body;
   a first sealing member compressed between the lid section and the cover;
   a second sealing member compressed between (i) the one end of the cover and (ii) the first frame or the second frame, the second sealing member having a direction of compression of the second sealing member that is different than a direction of compression of the first sealing member; and
   a fastener (i) fastening the cover onto at least one of the first frame, the second frame, or the lid section, and (ii) maintaining the first sealing member and second sealing member in a compressed state, wherein the fastener includes a tab formed on an outer periphery of the first frame or the second frame and a claw that extends from the one end of the cover body and is configured to engage with the tab, and
   wherein the tab and the claw are circumferentially adjacent to each other.

2. The rotating electric machine of claim 1, wherein the direction of compression of the first sealing member is parallel with an axis of the cover body, and the direction of compression of the second sealing member is perpendicular to the axis of the cover body.

3. The rotating electric machine of claim 2, wherein the cover includes an inside annular section that extends from the other end of the cover body toward the one end of the cover, the first sealing member is disposed between the lid section and the inside annular section, and the second sealing member is disposed between (i) the first frame or the second frame and (ii) the one end of the cover.

4. The rotating electric machine of claim 1, wherein the direction of compression of the first sealing member is perpendicular to an axis of the cover body, and the direction of compression of the second sealing member is parallel with the axis of the cover body.

5. The rotating electric machine of claim 4, wherein the cover includes an outer flange that extends in a radially outward direction from the one end of the cover body, the first sealing member is disposed at a position between the lid section and the other end of the cover, and the second sealing member is disposed at a position between (i) the first frame or the second frame and (ii) the outer flange.

6. The rotating electric machine of claim 1, wherein the lid section has a groove on a surface of the lid section facing away from the motor section and toward the cover, and the cover has an extension engaged with the groove and configured to prevent a radially-outwardly expanding deformation of the cover relative to the lid section and a shifting movement of the cover toward the motor section relative to the lid section.

7. The rotating electric machine of claim 1, wherein the fastener is a screw that fastens the cover to the lid section, the first frame, or the second frame.

8. The rotating electric machine of claim 1, further comprising:
   a connector connected to at least one of
   (i) a power supply wire harness extending from the lid section in a direction that is opposite to the controller section, the power supply wire harness supplying an electric power for the winding wire, or
   (ii) a control wire harness that transmits a signal to the controller section.

9. The rotating electric machine of claim 1, further comprising at least one screw and corresponding hole through one of the lid section and the cover, wherein the screw passes through the hole to fix the lid section to the cover and the hole is located outside of the first sealing member with respect to a sealing direction of the first sealing member.

10. The rotating electric machine of claim 1, wherein the claw comprises a substantially L-shaped portion.

11. The rotating electric machine of claim 10, further comprising a second substantially L-shaped portion that is a mirror image of and adjacent to the substantially L-shaped portion.

\* \* \* \* \*